United States Patent [19]

May

[11] Patent Number: 4,633,728

[45] Date of Patent: Jan. 6, 1987

[54] GEAR SELECTOR CONTROL FOR MANUAL TRANSMISSION

[75] Inventor: Kenneth W. May, Livonia, Mich.

[73] Assignee: Ford Motor Company, Dearborn, Mich.

[21] Appl. No.: 772,820

[22] Filed: Sep. 5, 1985

[51] Int. Cl.$^4$ ............................ G05G 5/02; G05G 9/12
[52] U.S. Cl. ............................................ 74/476; 74/526
[58] Field of Search .................................... 74/476, 526

[56] References Cited

U.S. PATENT DOCUMENTS

| | | | |
|---|---|---|---|
| 1,241,415 | 9/1917 | Masury et al. | 74/473 |
| 1,250,355 | 12/1917 | Robinson et al. | 74/476 |
| 2,193,733 | 3/1940 | Maier | 74/473 |
| 2,245,714 | 6/1941 | Price et al. | 74/473 |
| 2,839,945 | 6/1958 | Zion | 74/473 |
| 3,473,403 | 10/1969 | Biro | 74/473 |
| 3,646,828 | 3/1972 | Milton et al. | 74/484 |
| 3,962,930 | 6/1976 | Frazee | 74/473 |
| 4,018,099 | 4/1977 | O'Brien et al. | 74/476 X |
| 4,028,959 | 6/1977 | Long | 74/473 |
| 4,060,157 | 11/1977 | Hillstrom | 74/473 |
| 4,068,540 | 1/1978 | Beckerman | 74/473 |
| 4,193,316 | 3/1980 | Kelbel | 74/477 |
| 4,275,614 | 6/1981 | Okubo et al. | 74/476 |
| 4,297,910 | 11/1981 | Myers | 74/526 X |

FOREIGN PATENT DOCUMENTS 2062961 12/1970 Fed. Rep. of Germany .

Primary Examiner—Allan D. Herrmann
Attorney, Agent, or Firm—Frank G. McKenzie; Donald J. Harrington

[57] ABSTRACT

The gear shift mechanism of a manually operated transmission having multiple forward speed ratios and a reverse drive ratio includes a gear selector shaft under the manual control of the vehicle operator. A selector pin fixed to the selector shaft moves within a system of interconnected slots in a guide plate mounted on the transmission casing. Movement of the gear selector lever causes the selector pin to move within the restricted path defined by the slots. A pawl supported on the surface of the guide plate is mounted pivotably in a slotted hole that permits linear displacement with respect to the pivot pin. A torsion spring continuously applies a resilient force to the pawl tending to restore the pawl to a normal position, where it prevents movement of the selector mechanism from a forward drive position directly to the reverse drive position. The device applies a force to the selector mechanism that resists movement of the selector pin to the reverse drive position but permits the gear shift to be made from the neutral plane into the reverse drive position. The pawl absolutely prevents movement of the selector mechanism from the forward drive position that is in the same plane as the reverse drive position and provides a guided surface along which the selector mechanism moves from the highest forward gear ratio to the lower gear ratios.

4 Claims, 7 Drawing Figures

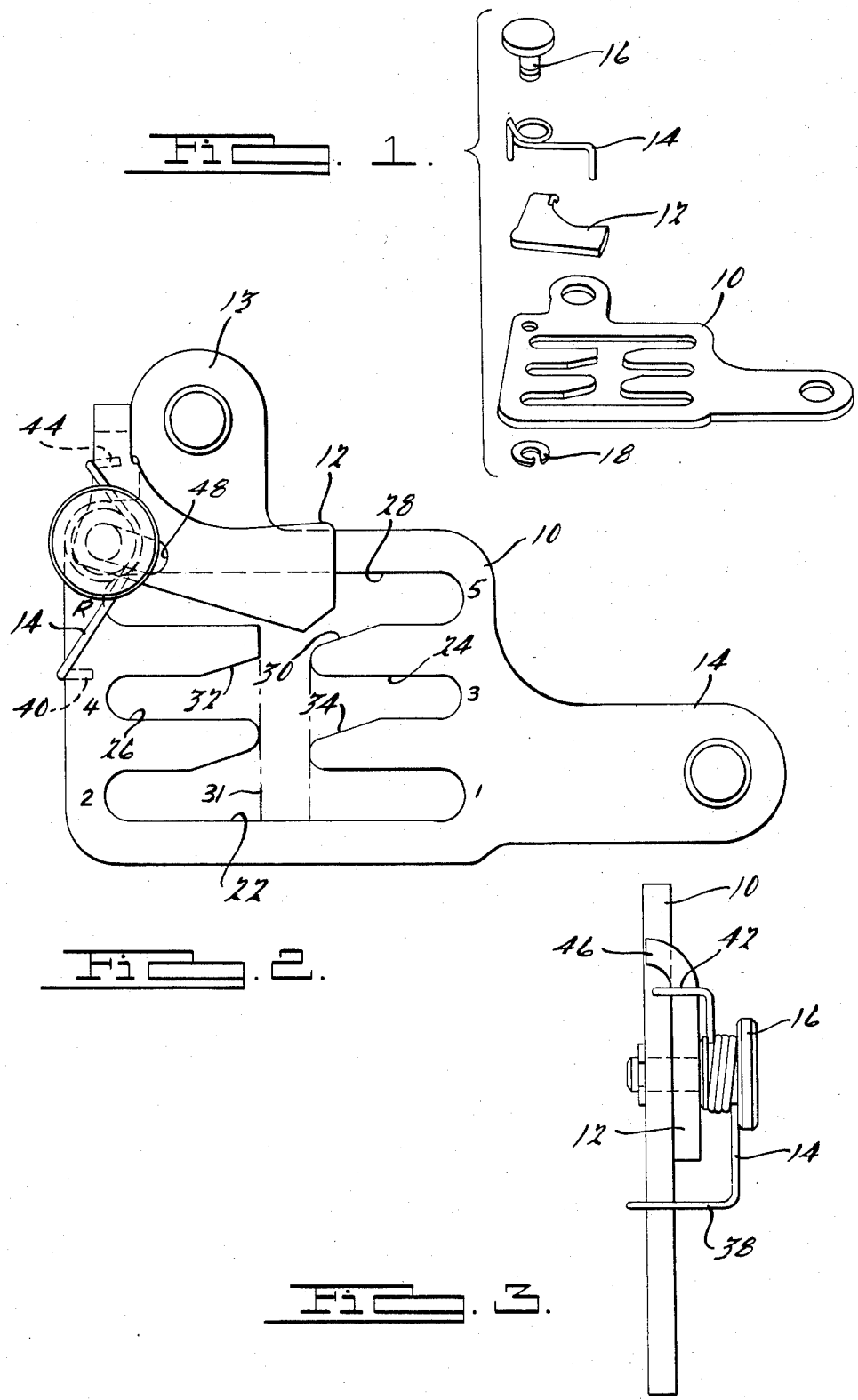

GEAR SELECTOR CONTROL FOR MANUAL TRANSMISSION

BACKGROUND OF THE INVENTION

1. Field of the Invention.

This invention relates to the control of a manually operated gear shift mechanism, and more particularly pertains to such a control for regulating the movement of the gear selector shaft.

2. Description of the Prior Art.

Front wheel drive motor vehicles of the transaxle type, wherein the engine and transmission are positioned transversely with respect to the fore and aft axis of the motor vehicle, require some means for guiding and restricting the movement of the gear selector lever. This requirement is especially acute in transaxles because of the greater distance between the shift mechanism and the gear shaft lever than in conventional in-line transmissions. Transaxle motor vehicle design requires that the transmission be located in a more forward position in the vehicle than if the vehicle were of the in-line type. Conventional motor vehicles have the manual transmission positioned immediately below the gear selector lever, which is controlled by the vehicle operator. The response of the shift mechanism to the control of the operator occurs over a relatively shorter path and therefore the operator receives a more certain correspondence between the selected position of the shift lever and the operating speed ratio than is the case with a transaxle.

Manual transaxle vehicle design requires a distance of about three or four feet between the location of the selector lever handle and the transmission that it controls. In a vehicle equipped with a transaxle and a transversely positioned engine, the transmission and engine assembly rotates about a transverse axis with respect to the chassis. Rotation of this sort occurs because of accelerations which continually occur in normal driving conditions. Movement of the gear shift mechanism that results from this rotation contributes to an uncertain indication of the relationship between the speed ratio in which the transmission is operating and the position of the gear selector handle.

To maintain the conventional shifting pattern of the operator controlled gear selector lever for use with a transaxle having five speed ratios and a reverse drive ratio, the selector lever moves in a single fore and aft plane in order to engage the fifth speed ratio and the reverse drive ratio. With such an arrangement, it is possible that the selector lever can be moved from the fifth gear ratio position to the reverse drive ratio position by merely depressing the clutch pedal, which disengages the neutral clutch, and moving the selector lever forward to the reverse drive ratio position. If such a gear change is made at high speed, the transmission could sustain damage.

To avoid this problem, the reverse drive position of the selector lever and the fifth gear ratio position are placed in different planes, usually at opposite sides of the gear selector planes used for selection of the four lowest forward drive ratios. This complicates the shift pattern and adds complexity to the gear shift mechanism.

SUMMARY OF THE INVENTION

To overcome these problems, the control according to this invention provides a specific, well-defined path for the gear selector lever regardless of any movement the engine-transaxle assembly may undergo in relation to the vehicle chassis.

The control device according to this invention prevents inadvertent shifting from a forward gear ratio position to the reverse drive position. The vehicle operator senses an increase in shifting force required to move the shift lever into the plane that contains the highest forward speed ratio and the reverse drive ratio. Whenever the shift lever is moved from the highest forward speed ratio position to any other forward drive position, the control according to this invention provides an inclined surface that guides movement of the shift mechanism away from the reverse drive position and toward the next lower gear ratio position and prevents movement from a forward gear ratio position into the reverse drive position. In order to engage the reverse drive, the control mechanism must be moved directly from the neutral plane into the reverse drive plane and then directly to the reverse drive position within that plane.

A transmission gear selector control according to this invention provides a guide plate which defines the range of movement of the gear shift mechanism by providing a system of interconnected slots within which a selector pin secured to the gear shift mechanism moves and is restricted. A pawl, supported on the upper surface of the guide plate, is mounted for pivotal movement about a pin secured to the guide plate. The pawl provides a slotted hole through which the attachment to the pivot pin is made. A torsion spring applies a continuous resilient force to the pawl tending to move it toward the slot system to a position of potential obstruction with the selector pin. The pawl is formed with a surface which can be contacted by the selector pin when it moves from the highest forward gear ratio position to the neutral plane. As a result of this movement, the pawl is displaced in the slotted hole and rotates about the pivot pin to a position that mechanically prevents movement of the selector pin from the top gear position to the reverse drive position. In addition, as a result of this movement, rotation of the pawl provides a ramp surface that guides the selector pin away from the reverse drive position and toward the second highest gear ratio position.

BRIEF DESCRIPTION OF THE DRAWINGS

FIG. 1 is an isometric view showing the components of the gear selector control according to the present invention in spaced-apart relationship.

FIG. 2 is a plan view of the guide plate assembly.

FIG. 3 is a side view of the assembly of FIG. 2.

DESCRIPTION OF THE PREFERRED EMBODIMENT

Figure 4A:
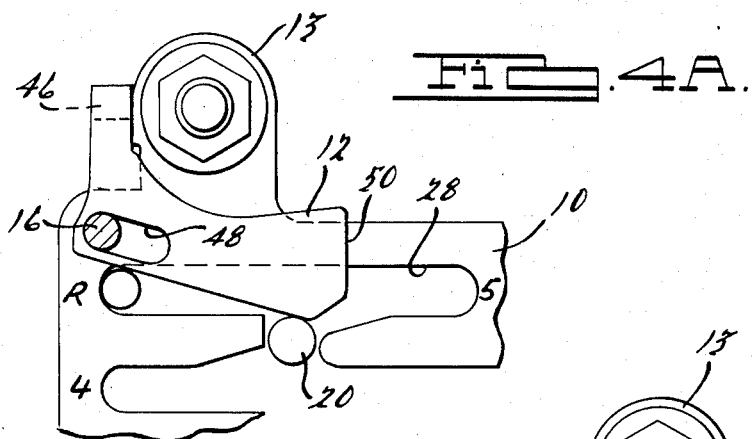
FIGS. 4A–4D show the pawl and guide pin in various stages of activation and deactivation.

A manual transmission gear shift mechanism, with which the gear selector control of this invention can be used, is described in U.S. Pat. No. 4,297,910, issued Nov. 3, 1981, the entire disclosure of which is incorporated herein by reference. The components of the reverse shift inhibitor are shown in FIG. 1 and include a gate plate 10, reverse lockout pawl 12, torsion spring 14, pivot pin 16 and C-clip 18. The gate plate is mounted within the casing of the transmission above and generally parallel to the axis of a selector shaft. This shaft carries a control block having a selector pin 20 extending radially outward from the axis of the selector shaft, as illustrated in FIG. 2 of the referenced patent.

Referring now to FIGS. 2 and 3, the gate plate 10 is formed with attachment lugs 12 and 14, by which it is mechanically and removably attached by screws inserted into attachment holes and threaded into the casing of the transmission. The guide plate is formed with a system of interconnected slots within which the selector pin moves subject to the restriction caused by contact of the selector pin with the surfaces of the slots. The position of the selector pin at the extremities of the slots corresponds to the correct position of the gear shift mechanism for the several forward gear ratios and the reverse drive ratio. For example, with the selector pin located at the right-hand end of slot 22 the gear shift mechanism is disposed for operation of the transmission in the first gear ratio. When the selector pin is located at the left-hand end of slot 22, the gear shift mechanism is disposed for operation of the transmission in the second speed ratio. Similarly, the right-hand end and left-hand end of slots 24 and 26, which together define a third slot, correspond to the position of the gear shift mechanism for operation of the transmission in the third and fourth speed ratios, respectively. When the selector pin is at the right-hand end of slot 28, which defines a first slot, the shift mechanism places the transmission in the fifth speed ratio, and when the selector pin is at the left-hand end of slot 28, the shift mechanism places the transmission in the reverse drive position. The centrally located vertically directed interconnection between slots 22, 24, 26 and 28 is in the neutral plane of motion of the gear selector lever and defines a second slot 31. When the lever is located in the neutral plane, the transmission input shaft is disconnected from the output shaft of the transmission. Certain corners of the slots adjacent the central slot corresponding to the neutral plane are chamfered at 30, 32, 34 to facilitate movement of the shift mechanism between the various gear ratio positions.

The guide plate includes a hole 36 adapted to receive pivot pin 16, which is retained in position when C-clip 18 is snapped over the recess at the end of the shank of pin 16. A pawl moves above the upper surface of the guide plate and is held in position to pivot on the shank of pin 16. Torsion spring 14 is looped around that portion of the shank of pin 16 which is larger in diameter than the portion that receives the pawl. The spring has a leg 38 extending from the upper surface to the lower surface of the guide plate and terminating in a hooked end 40, received below and held in position on a lower surface of the guide plate. Similarly at the opposite side of the axis of pin 16, torsion spring 14 has a second leg 42 extending from the upper to the lower surface of the guide plate and terminating in a hooked end 44, retained in position on the lower surface of pawl 12. Counterclockwise, pivotal movement of the pawl about the axis of pin 16 from the position shown in FIG. 2 produces in the spring a force applied to the pawl tending to restore the pawl to the position of FIG. 2.

The pawl is generally planar but has a downwardly turned finger 46, which is forced by the spring into contact with the side of the guide plate, which acts as a stop preventing further clockwise pivotal movement of the pawl. The hole 46 through the thickness of the pawl into which pin 16 is fitted is slotted to permit linear displacement of the pawl relative to the guide plate between the positions shown in FIG. 4C and 4D.

To place the transmission in position for reverse drive operation, the selector pin is moved from the central or neutral slot at its intersection with the 3–4 plane, which comprises slots 24 and 26, to the intersection of the neutral slot with the 5-R plane, which is defined by slot 28.

Figure 4B:
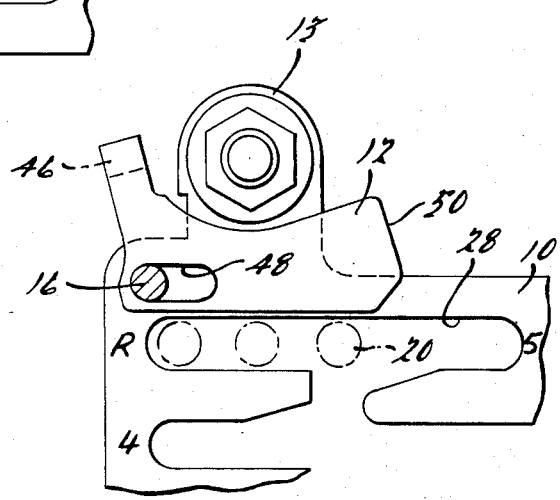
Figure 4C:
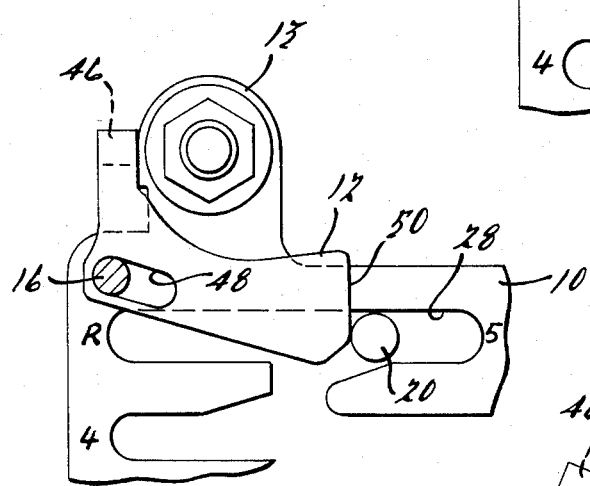
Figure 4D:
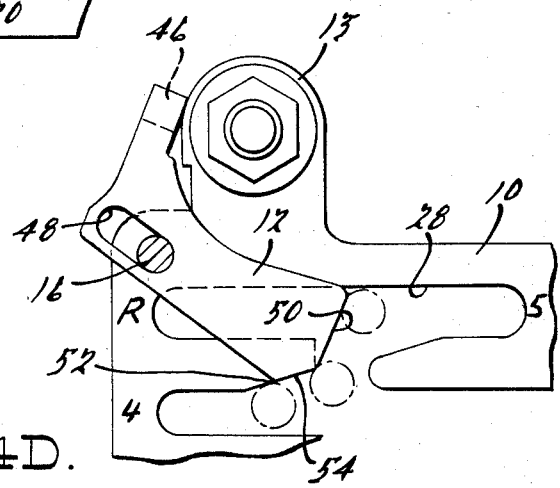

FIGS. 4A and 4B show that this movement of the selector pin causes contact with pawl 12 and rotation of the pawl about pivot pin 16 from the position of 4A, where the pawl is in position for potential obstruction with the selector pin, to the position of FIG. 4B, where the pin is forced by the selector pin to a nonobstructing position. With the pawl in the position of FIG. 4B, the gearshift mechanism can be moved to either the fifth gear position or the reverse drive position. However, when the selector pin is moved to the left-hand end of slot 28, to the reverse drive position, pawl 12 rotates clockwise to the position in FIG. 4C, holds pin 20 in the position of FIG. 4B and resists movement out of the reverse drive position. When the selector pin is moved instead to the right-hand end of slot 28 from the neutral position in slot 28, i.e., to the fifth gear position of FIG. 4C, the pawl pivots about pin 16 due to the effect of spring 14 until finger 46 contacts the side of lug 13 on the guide plate.

To move the gear mechanism so that the selector pin is moved out of the fifth gear position within slot 28, selector pin 20 is moved toward the neutral position and into contact with surface 50 on the pawl. As the selector pin is moved from the point of first contact with surface 50 further toward the neutral plane, the slotted hole 48 in the pawl permits linear displacement of the pawl with respect to the pin, and spring 14 maintains finger 46 of the pawl in contact with the lug 13 of the guide plate. Therefore, the pawl both pivots and moves linearly with respect to pin 16 until it comes to the position shown in FIG. 4D, where the pin is seated in the end of slotted hole 48 and finger 46 is in contact with lug 13. In this position, surface 50 of the pawl forms an inclined ramp at the edge of the neutral plane, which surface guides the selector pin 20 toward the 3–4 plane and more particularly to the left-hand end of slot 26, i.e., toward the fourth gear position.

Once the selector pin has cleared the lower edge of the pawl 52, spring 14 returns the pawl to the position shown in FIG. 4A. However, as the selector pin is moved from the 5-R plane to the 3–4 plane, the pin can be moved easily to the right-hand end of slot 24, i.e., to the third gear position.

It can be seen from this that there is a resilient force applied to the selector pin opposing its movement along the neutral plane toward the 5-R plane from the 3–4 plane. The resilient force inhibits the inadvertent shifting into the reverse gear position. Furthermore, this invention absolutely prevents the movement of the selector pin from the fifth gear position into the reverse drive position, yet it facilitates and guides movement from the fifth gear position into the fourth gear position. A gear shift mechanism operating under the control device according to this invention permits shifting to the reverse drive position only from the vicinity of the neutral plane and absolutely prevents shifting into the reverse position from any of the forward drive positions in the same plane as the reverse drive position. The driver of the vehicle will sense that an increase in force must be applied to the shift lever in order to move the shift mechanism to the reverse drive position because of the effect of the torsional spring.

Having described the preferred embodiment of my invention, what I claim and desire to secure by U.S. Letters Patent is:

1. A transmission gear selector for controlling the movement of a gear shift mechanism comprising:
   a selector pin secured to the gear shift mechanism for movement therewith;
   a guide plate having a system of interconnected slots, into which system the selector pin is fitted and by which its movement is restricted, including a first slot extending between a first position of the selector pin that corresonds to a forward drive ratio position of the gear shift mechanism and a second position of the selector pin that corresponds to a reverse drive ratio position of the gear shift mechanism, a third slot parallel to and adjacent the first slot and extending between third and fourth positions of the selector pin, which corresond to forward drive positions of the gear shift mechanism, and a second slot that intersects the first slot between the first position and the second position and intersects the third slot between the third position and the fourth position;
   a pivot pin fixed to the guide plate;
   a torsion spring supported on the pin and the guide plate; and
   a pawl pivotably mounted on the pin, connected to the torsion spring for resilient movement with respect to the guide plate, adapted for contact with the selector pin, including a slotted hole through which the pivot pin pivotably mounts the pawl to the guide plate and stop means for limiting pivotal movement of the pawl, for preventing movement of the selector pin from the first position to the second position and for guiding movement of the selector pin from the first position toward the third slot.

2. The gear selector control of claim 1 wherein the pawl is pivoted by the selector pin about the pivot pin against the force of the torsion spring as the selector pin moves from the first position to the second position.

3. A transmission gear selector for controlling the movement of a gear shift mechanism comprising:
   a selector pin secured to the gear shift mechanism for movement therewith;
   a guide plate having a system of interconnected slots, into which system the selector pin is fitted and by which its movement is restricted, including a first slot extending between a first position of the selector pin that corresonds to a forward drive ratio position of the gear shift mechanism and a second position of the selector pin that corresponds to a reverse drive ratio position of the gear shift mechanism, a third slot parallel to and adjacent the first slot and extending between third and fourth positions of the selector pin, which corresond to forward drive positions of the gear shift mechanism, and a second slot that intersects the first slot between the first position and the second position and intersects the third slot between the third position and the fourth position;
   a pivot pin fixed to the guide plate;
   a torsion spring supported on the pin and fixed to the guide plate; and
   a pawl mounted on the pin, connected to the torsion spring for resilient movement with respect to the guide plate, adapted for contact with the selector pin including a slotted hole through which the pivot pin pivotably mounts the pawl to the guide plate, and stop means for limiting pivotal movement of the pawl, for preventing movement of the selector pin from the first position to the second position, for blocking movement of the selector pin from the first position to the second position and for guiding movement of the selector pin from the first position toward the third slot.

4. The gear selector control of claim 3 wherein the pawl is pivoted by the selector pin about the pivot pin against the force of the torsion spring as the selector pin moves from the first position to the second position.

* * * * *